United States Patent
Graf

(10) Patent No.: US 11,231,101 B2
(45) Date of Patent: Jan. 25, 2022

(54) METHOD FOR OPERATING A MOTOR VEHICLE, AND MOTOR VEHICLE

(71) Applicant: AUDI AG, Ingolstadt (DE)

(72) Inventor: Philip Graf, Kornwestheim (DE)

(73) Assignee: AUDI AG, Ingolstadt (DE)

( * ) Notice: Subject to any disclaimer, the term of this patent is extended or adjusted under 35 U.S.C. 154(b) by 271 days.

(21) Appl. No.: 16/300,239

(22) PCT Filed: May 4, 2017

(86) PCT No.: PCT/EP2017/060709
§ 371 (c)(1),
(2) Date: Nov. 9, 2018

(87) PCT Pub. No.: WO2017/194388
PCT Pub. Date: Nov. 16, 2017

(65) Prior Publication Data
US 2019/0154135 A1 May 23, 2019

(30) Foreign Application Priority Data

May 9, 2016 (DE) .................. 10 2016 207 912.3

(51) Int. Cl.
*F16H 57/04* (2010.01)
*B60L 1/06* (2006.01)
(Continued)

(52) U.S. Cl.
CPC ............ *F16H 57/0413* (2013.01); *B60L 1/06* (2013.01); *B60L 53/00* (2019.02); *B60L 53/16* (2019.02);
(Continued)

(58) Field of Classification Search
CPC .. F16H 57/0413; F16H 57/0483; B60L 53/50; B60L 53/00; B60L 53/16;
(Continued)

(56) References Cited

U.S. PATENT DOCUMENTS 5,895,590 A    4/1999  Suzuki
9,127,762 B2 *  9/2015  Oh ...................... F16H 57/0417
(Continued)

FOREIGN PATENT DOCUMENTS

AT         252666 B     3/1967
CN      102211557 A    10/2011
(Continued)

OTHER PUBLICATIONS

European Examination Report dated Oct. 1, 2019, in connection with corresponding EP Application No. 17 721 385.7 (7 pgs., including machine-generated English translation).

(Continued)

*Primary Examiner* — Shawntina T Fuqua
(74) *Attorney, Agent, or Firm* — Maier & Maier, PLLC

(57) ABSTRACT

A method for operating a motor vehicle, in which an electrical energy storage system of the motor vehicle is charged, the system being designed to store electrical energy for a drive assembly of the motor vehicle. At least one electrical heating device of the motor vehicle is supplied thereby with electrical energy from a charging station that is designed to charge the electrical energy storage system. By the at least one electrical heating device, at least one component of a drive train of the motor vehicle is subjected to heat, this component being arranged in the flow of force between the drive assembly and the at least one wheel when driving at least one drivable wheel of the motor vehicle.

7 Claims, 1 Drawing Sheet

(51) Int. Cl.
  *B60L 53/00* (2019.01)
  *B60L 53/50* (2019.01)
  *B60L 53/16* (2019.01)

(52) U.S. Cl.
  CPC .......... *B60L 53/50* (2019.02); *F16H 57/0483* (2013.01); *B60L 2240/485* (2013.01); *Y02T 10/70* (2013.01); *Y02T 10/7072* (2013.01); *Y02T 90/14* (2013.01)

(58) Field of Classification Search
  CPC ...... B60L 1/06; B60L 2240/485; Y02T 10/70; Y02T 10/7072; Y02T 90/14; Y02T 90/12
  See application file for complete search history.

(56) References Cited

U.S. PATENT DOCUMENTS

| | | | |
|---|---|---|---|
| 2009/0015023 A1* | 1/2009 | Fleckner | B60W 10/26 290/40 C |
| 2010/0280698 A1 | 11/2010 | Ichikawa | |
| 2011/0095717 A1 | 4/2011 | Takizawa | |
| 2012/0125278 A1 | 5/2012 | Ries-Mueller | |
| 2013/0125853 A1 | 5/2013 | Pursifull | |
| 2013/0213335 A1* | 8/2013 | Thomas | F16H 57/0413 123/142.5 R |

FOREIGN PATENT DOCUMENTS

| | | |
|---|---|---|
| CN | 102917901 A | 2/2013 |
| DE | 603 07 939 T2 | 9/2007 |
| DE | 10 2007 032 726 A1 | 1/2009 |
| DE | 10 2010 034 105 A1 | 4/2011 |
| DE | 10 2010 021 028 A1 | 11/2011 |
| DE | 10 2011 101 357 A1 | 11/2012 |
| DE | 10 2013 001 116 A1 | 7/2014 |
| WO | 2014/065309 A1 | 5/2014 |

OTHER PUBLICATIONS

Examination Report dated Apr. 20, 2017 of corresponding German application No. 10 2016 207 912.3; 6 pages.
International Search Report and Written Opinion of the International Search Authority dated Jul. 20, 2017 in corresponding International application No. PCT/EP2017/060709; 14 pages.
Notification of Transmittal of Translation of the International Preliminary Report on Patentability dated Nov. 22, 2018, in connection with corresponding international Application No. PCT/EP2017/060709; 11 pages.
German Office Action dated Nov. 25, 2020, in connection with corresponding DE Application No. 10 2016 207 912.3 (6 pp., including machine-generated English translation).
Chinese Office Action dated Apr. 2, 2021, in connection with corresponding CN Application No. 201780028578.X (13pp., including machine-generated English translation).

* cited by examiner

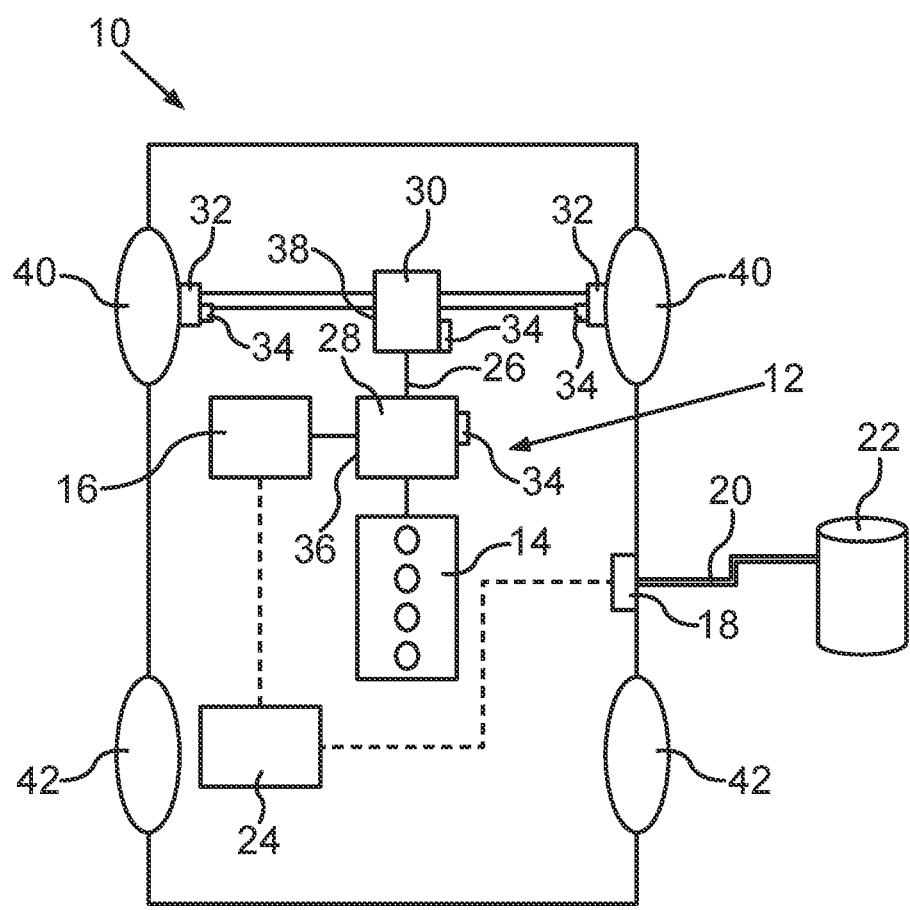

METHOD FOR OPERATING A MOTOR VEHICLE, AND MOTOR VEHICLE

FIELD

The invention relates to a method for operating a motor vehicle, in which an electrical energy storage system of the motor vehicle is charged, the system being designed to store electrical energy for a drive assembly of the motor vehicle. At least one electrical heating device of the motor vehicle is supplied with electrical energy from a charging station, which is designed to charge the electrical energy storage system. Furthermore, the invention relates to a motor vehicle.

BACKGROUND

DE 10 2010 021 028 A1 describes an interaction between a heat management and a charging management during external charging of a plug-in hybrid or electric vehicle. The heat management of the motor vehicle regulates a cooling or heating of components in the form of an engine, a battery, or power electronics.

Furthermore, US 2010/0280698 A1 describes a hybrid vehicle in which a charging connection obtains current from a current source outside the vehicle. While a current storage device of the vehicle is being charged, a block heater warms up an internal combustion engine of the vehicle in that the block heater receives operating current from the charging connection.

Furthermore, it is known from the prior art how to draw the electrical power needed for an air conditioning or a heating of the passenger compartment from a charging station or charging column during the charging of vehicles with an electrical energy storage system that is designed to store electrical energy for a drive assembly of the vehicle. This applies, for example, to battery electrical vehicles or plug-in hybrid vehicles, which are also known as plug-in hybrid vehicles. In this way, one can avoid drawing the energy for the warming or cooling of the passenger compartment from the traction battery.

Usually, however, drive train components of the motor vehicle are brought up to their operating temperature by way of losses in the particular components.

SUMMARY

The object of the present invention is therefore to create a method and a motor vehicle of the kind mentioned above, by means of which the driving range of the motor vehicle can be increased.

In the method according to the invention for operating a motor vehicle, an electrical energy storage system of the motor vehicle is charged, being designed to store electrical energy for a drive assembly of the motor vehicle. At least one electrical heating device of the motor vehicle is provided with electrical energy from a charging station, which is designed to charge the electrical energy storage system. In this case, by means of the at least one electrical heating device, at least one component of a drive train of the motor vehicle is subjected to heat, this component being situated in the flow of force between the drive assembly and the at least one wheel when driving at least one drivable wheel of the motor vehicle.

The above is based on the knowledge that the mechanical components of the drive train, in particular, which are situated between the drive assembly and the wheel, have a worse efficiency at low temperatures. Low temperatures of these components therefore result in increased driving resistance. This is made noticeable until such time as the components have reached their operating temperature. But increased driving resistance results in increased fuel consumption and therefore a reduced driving range of the motor vehicle.

If, however, as in the present invention, these mechanical components are warmed up by means of the electrical heating devices of the motor vehicle, the driving resistances of the motor vehicle during driving operation can be reduced. However, the electrical energy for subjecting the at least one component of the drive train of the motor vehicle to heat is taken directly from the charging station or charging column. Since this electrical energy therefore does not need to be drawn from the electrical energy storage system of the vehicle during the driving of the motor vehicle, the energy reserves of the electrical energy storage system are spared. Moreover, losses in the range of travel of the motor vehicle or the fuel consumption of the motor vehicle can be avoided for the most part, in particular, and especially entirely, which, without the electrical heating of the at least one component during driving operation, the energy reserves alone would provide for the heating of the at least one component of the drive train due to the power losses.

Accordingly, the reducing of the driving resistance of the motor vehicle even before the start of the drive makes possible a reduced fuel consumption of the motor vehicle and an increasing or extending of the range of travel of the motor vehicle.

The thermal preconditioning or heating of the at least one component of the drive train can be used in a battery-operated or battery electric vehicle (BEV), in which only an electrical drive assembly provides for the forward motion of the motor vehicle. In similar fashion, the thermal preconditioning of the at least one component of the drive train can be used in a plug-in hybrid vehicle. Namely, a plurality of torque converters, transmission gearings, and the equivalent are usually provided in a plug-in hybrid electric vehicle (PHEV), such as are also used in a motor vehicle propelled by an internal combustion engine. Thus, the subjecting of the at least one component of the drive train to heat for decreasing the driving resistance is also especially advantageous here.

In addition to the at least one component that is situated between the drive assembly and the driven wheels in the case of the driven wheels, it is also possible to subject the electrical and/or internal combustion engine drive assembly of the motor vehicle itself to heat by means of the at least one electrical heating device.

Preferably, however, the at least one component subjected to heat is a gearing of the motor vehicle. Such a gearing may be designed as a multi-step transmission, having various transmission ratios. In particular, however, the gearing may be designed as a gearing with a fixed, single-step transmission ratio, such as is employed, for example, in battery electrical motor vehicles to reach a maximum driving speed. In such gearings, on account of the engaging of mechanical components such as gears with each other, the supplying of heat by means of the at least one electrical heating device is especially advantageous for increasing the efficiency and reducing the power loss.

In addition or alternatively, the at least one component subjected to heat is a bearing of a drive shaft of the motor vehicle. Here as well, the supplying of heat increases the smooth movement and hence reduces the losses in the transfer of the drive energy by means of the drive shaft to the at least one driven wheel of the motor vehicle.

It has been shown to be further advantageous for the at least one component subjected to heat to be a differential gearing of the motor vehicle. That is, a differential gearing is also prone to substantial losses in regard to the transfer of drive power for as long as the differential gearing has not yet reached its operating temperature.

The differential gearing may be designed, in particular, as a longitudinal or center differential, by means of which the drive power can be distributed between a front axle and a rear axle. Furthermore, the differential gearing can be designed as an axle differential, which balances the rotary speed between the two wheels arranged on one axle of the motor vehicle.

It is furthermore advantageous when the at least one component subjected to heat is a wheel bearing of the at least one wheel. Namely, the supplying of heat in the region of the wheel bearing is also advantageous in reducing the driving resistance of the motor vehicle.

The at least one electrical heating device may be in contact with a lubricant, which lubricates at least one part, especially a movable part of the component. The lubricant is subjected to the heat in this case. In this way, the heat can be brought especially efficiently to the place or places of the component at which structural parts of the component are engaging and the lubricant provides a lubrication of these parts.

For example, the at least one electrical heating device can be arranged in a housing of the component, in which is found the lubricant for the structural parts of the component.

In addition or alternatively, the at least one electrical heating device may be in contact with a housing of the component and/or with at least one part of the component arranged in a housing. In this case, the housing and/or the at least one part is subjected to the heat. Such an arrangement, especially on an outer side of the housing, is especially advantageous in terms of the available design space in the housing. Therefore, no design space has to be used inside the housing for the electrical heating device. Furthermore, the supplying of the electrical heating device with electrical energy provided by the charging station can also be realized especially easily in this case.

However, the electrical heating device may also be in contact with the outside of the housing of the component and a portion thereof may extend into the housing for a distance and thereby provide for a heating of lubricant situated in the housing and/or of structural parts of the component arranged in the housing.

The at least one electrical heating device can be supplied with electrical energy during the charging of the electrical energy storage system by the charging station. In this way, the time needed in any case for the charging can be utilized in addition for the warming up of the at least one component of the drive train.

Especially in the case of rapidly heatable components of the drive train, however, the warm-up by means of the at least one heating device need not occur for the entire period provided for the charging of the energy storage system.

Instead, it is sufficient to subject the at least one component of the drive train to heat only during a portion of the time utilized overall for the charging of the electrical energy storage system. If the time expected for warming up the at least one component of the drive train to its operating temperature is shorter than the time needed for the charging of the energy storage system, the at least one component of the drive train will be subjected to heat preferably toward the end of the period for the charging of the electrical energy storage system.

However, the supplying of the at least one electrical heating device with electrical energy by the charging station may also overlap with the time for charging the electrical energy storage system or may terminate after the charging of the electrical energy storage system. Also in this way, it can be assured especially well that the at least one component of the drive train has been subjected to sufficient heat and, in particular, has been brought up to its operating temperature just before starting travel.

The motor vehicle according to the invention comprises an electrical energy storage system, which is designed to store electrical energy for a drive assembly of the motor vehicle. The motor vehicle has a charging connection by which an electrical connection can be produced between the electrical energy storage system and a charging station, which is designed to charge the electrical energy storage system. The motor vehicle comprises at least one electrical heating device, which can be supplied with electrical energy from the charging station. The at least one electrical heating device is arranged at least at one component of a drive train of the motor vehicle, which, when propelling at least one drivable wheel of the motor vehicle, is situated in the flow of force between the drive assembly and the at least one drivable or driven wheel.

By providing the at least one electrical heating device, which can be supplied with electrical energy by the charging station, the at least one component of the drive train of the motor vehicle can be thermally preconditioned or warmed up. In this way, the driving resistances of the motor vehicle during driving operation are reduced. Accordingly, the travel range of the motor vehicle can be increased, i.e., the distance traveled by supplying the electrical drive assembly of the motor vehicle with electrical energy from the electrical energy storage system of the motor vehicle.

The advantages and preferred embodiments described for the method according to the invention also apply to the motor vehicle according to the invention, and vice versa.

The features and combinations of features mentioned above in the description as well as the features and combinations of features mentioned below in the description of the figure and/or shown in the figure alone can be used not only in the respective indicated combination, but also in other combinations or standing alone, without leaving the scope of the invention. Hence, embodiments should also be regarded as being encompassed by and disclosed in the invention that are not explicitly shown in the figure or discussed, yet which emerge from and can be created by separate combinations of features from the explained embodiments. Hence, embodiments and combinations of features should also be regarded as disclosed that do not have all the features of an originally worded independent claim.

BRIEF DESCRIPTION OF THE DRAWING

Further advantages, features and details of the invention will emerge from the claims, the following description of preferred embodiments, and the figure(s).

FIG. 1 shows highly schematized, a motor vehicle during the charging of its electrical energy storage system, while at the same time components of the drive train of the motor vehicle are thermally preconditioned by means of electrical heating devices.

DETAILED DESCRIPTION

A motor vehicle 10, which is shown schematically in the figure, can be designed as an electric vehicle or a battery electrical vehicle or as a hybrid vehicle. Accordingly, a drive train 12 of the motor vehicle 10 may comprise, as its drive assemblies, an internal combustion engine 14 and an electric motor 16. The motor vehicle 10 has a charging connection 18, in which a charging cable 20 has been inserted in the present instance. The charging cable 20 is part of a charging station 22 or charging column.

Accordingly, the figure shows a situation in which an electrical energy storage system 24 of the motor vehicle 10 is being charged. The electrical energy storage system 24, being designed in the present instance as a traction battery or a high-voltage battery, supplies electrical energy for the electric motor 16 of the motor vehicle 10 when the motor vehicle 10 is being propelled by means of the electric motor 16 alone or assisted by the electric motor 16. A drive shaft 26 of the motor vehicle 10, belonging to the drive train 12, is shown only schematically in the present case. Furthermore, the figure shows, in highly schematized manner, a gearing 28, an axle differential 30, as well as wheel bearings 32 of the motor vehicle 10.

In the present case, during the charging process, electrical energy of the charging station 22 or charging column is used not just for the charging of the electrical energy storage system 24. Instead, components of the drive train 12 are also thermally preconditioned or warmed up. This is achieved with the aid of electrical heating devices 34, which are shown schematically in the figure. But for purposes of better clarity, the electrical connection lines from the charging connection 18 to the electrical heating devices 34 or heating elements are not represented in the present figure.

In the present case, for example, one of the electrical heating devices 34 is arranged on the gearing 28. With the aid of this heating device 34, for example, transmission oil or a similar lubricant located in the gearing 28 can be warmed up. For this purpose, the heating device 34 may be arranged on an outer side of a housing 36 of the gearing 28. However, the heating device 34 can also be arranged inside the housing 36 and thus be in direct contact with the transmission oil. Furthermore, the heating devices 34 may also supply heat to the bearings of the drive shaft 26 in a manner not shown more closely in the present case.

Similar to the gearing 28, the axle differential 30 may also be preheated with the aid of one of the heating devices 34 while the electrical energy storage system 24 of the motor vehicle 10 is being charged. Here as well, the heating device 34 can supply heat to a housing 38 of the axle differential 30, which is thus a structural part in which a lubricant is contained. However, the heating device 34 may also be arranged here inside the housing 38, for example, on a structural part inside the axle differential 30.

Furthermore, heating devices 34 arranged on the wheel bearings 32 may provide a warming up of the wheel bearings 32 on which wheels 40 of the motor vehicle 10, which are drivable by means of the drive train 12, are mounted. The wheel bearings of wheels 42 on an axle of the motor vehicle 10 that is not driven in the present case (and also not represented) may also be preheated in a manner not shown more closely in the present case with the electrical energy provided by the charging station 22 via corresponding heating devices while the electrical energy storage system 24 of the motor vehicle 10 is being charged.

In order to reduce the driving resistances of the motor vehicle 10 during driving operation, the electrical energy is used, especially during the charging process at the charging station 22 or charging column in the present instance, to warm up constituent parts or components of the drive train 12, especially the gearing 28, the wheel bearings 32, the axle differential 30, shaft bearings, and the like. This warm-up is performed, for example, by way of the electrical heating elements or heating devices 34 at the respective components. The energy for supplying the electrical heating elements or heating devices 34, however, is taken directly from the charging column or charging station 22. Hence, there are no losses in terms of the range of travel or the fuel consumption of the motor vehicle, which would otherwise occur on account of power losses during the driving operation of the motor vehicle 10, and thereby result in a heating of these components of the drive train 12.

The decreasing of the driving resistance before the start of the drive makes possible a reduction in the fuel consumption of the motor vehicle 10 and an extending of its travel range. However, the energy needed for this is taken directly from the charging infrastructure and therefore does not need to be drawn from the energy storage system 24 of the motor vehicle 10.

Thus, preferably, the drive train components, such as the wheel bearings 32, the gearing 28, differential gearing such as the axle differential 30, shaft bearings, and the like, are provided with electrical heating elements or the electrical heating devices 34.

These electrical heating devices 34 warm up the components or structural parts in the charging phase and thus reduce the driving resistances in the driving operation of the motor vehicle 10.

The invention claimed is:

1. A method for operating a motor vehicle, comprising:
an electrical energy storage system of the motor vehicle is charged, this system being designed to store electrical energy for a drive assembly of the motor vehicle, wherein at least one electrical heating device of the motor vehicle is supplied with electrical energy from a charging station, which is designed to charge the electrical energy storage system, and
heating at least one component of a drive train of the motor vehicle arranged in the flow of force between the drive assembly and at least one wheel when driving at least one drivable wheel of the motor vehicle,
wherein the at least one electrical heating device is arranged on an outer surface of a housing of the at least one component of the drive train of the motor vehicle such that a heating element of the at least one electrical heating device does not penetrate the housing,
wherein the at least one electrical heating device heats the housing of the at least one component of the drive train of the motor vehicle, which in turn heats the at least one component of the drive train of the motor vehicle.

2. The method as claimed in claim 1, wherein the at least one component that is subjected to heat is a gearing of the motor vehicle.

3. The method as claimed in claim 1, wherein the at least one component that is subjected to heat is a bearing of a drive shaft of the motor vehicle.

4. The method as claimed in claim 1, wherein the at least one component that is subjected to heat is a differential gearing, especially an axle differential, of the motor vehicle.

5. The method as claimed in claim 1, wherein the at least one component that is subjected to heat is a wheel bearing of the at least one wheel.

6. The method as claimed in claim 1, wherein the at least one electrical heating device is supplied with electrical energy during the charging of the electrical energy storage system and/or subsequent to the charging of the electrical energy storage system by a charging station.

7. A motor vehicle, comprising:
an electrical energy storage system, which is designed to store electrical energy for a drive assembly of the motor vehicle, having a charging connection by way of which an electrical connection can be produced between the electrical energy storage system and a charging station that is designed to charge the electrical energy storage system, and having at least one electrical heating device, which can be supplied with electrical energy from the charging station,
wherein the at least one electrical heating device is arranged on an outer surface of a housing of at least at one component of a drive train of the motor vehicle such that a heating element of the at least one electrical heating device does not penetrate the housing, which,
wherein the at least one component of the drive train of the motor vehicle, when propelling at least one drivable wheel of the motor vehicle, is arranged in the flow of force between the drive assembly and the at least one wheel,
wherein the at least one electrical heating device heats the housing of the at least one component of the drive train of the motor vehicle, which in turn heats the at least one component of the drive train of the motor vehicle.

* * * * *